Figure 1:
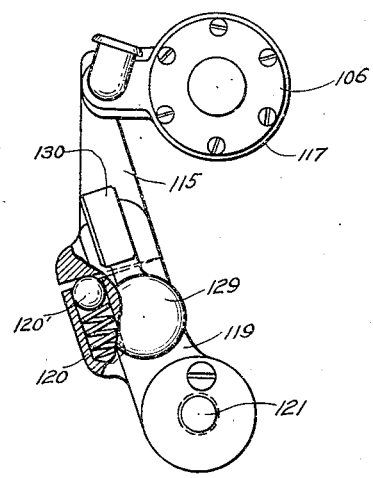

March 1, 1938. F. J. LOOMIS ET AL 2,109,451
SOUNDHEAD
Original Filed Oct. 14, 1932 3 Sheets-Sheet 1

INVENTOR
FRED J. LOOMIS
ELLWOOD W. REYNOLDS
BY
ATTORNEY

March 1, 1938.  F. J. LOOMIS ET AL  2,109,451
SOUNDHEAD
Original Filed Oct. 14, 1932   3 Sheets-Sheet 2

INVENTOR
FRED J. LOOMIS
ELLWOOD W. REYNOLDS
BY H.S. Snover
ATTORNEY

March 1, 1938.  F. J. LOOMIS ET AL  2,109,451
SOUNDHEAD
Original Filed Oct. 14, 1932   3 Sheets-Sheet 3
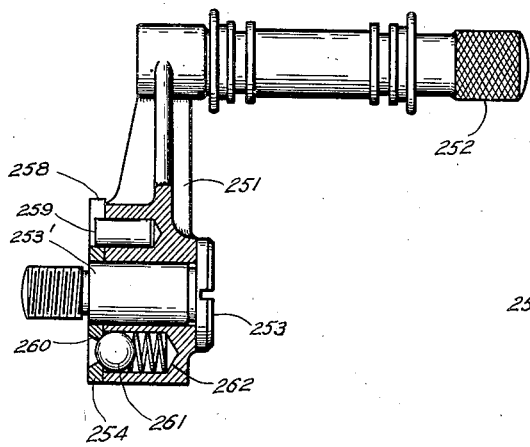
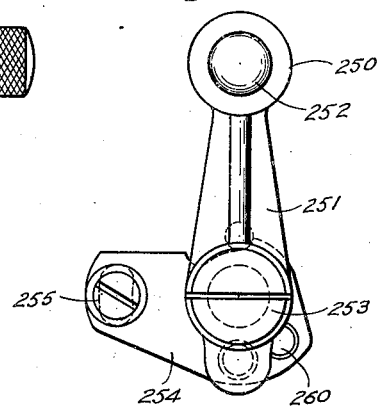
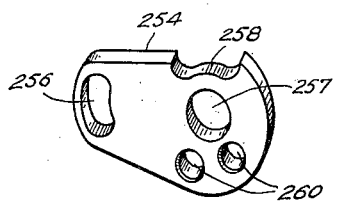
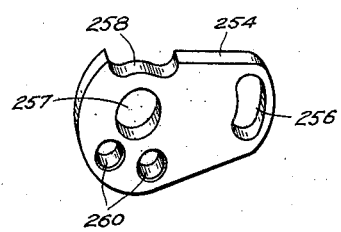
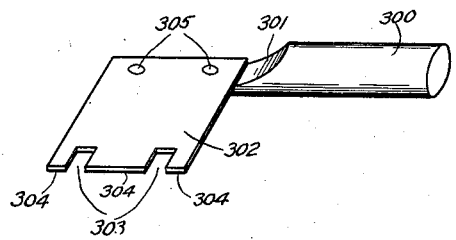
INVENTOR
FRED J. LOOMIS
ELLWOOD W. REYNOLDS
BY
ATTORNEY Patented Mar. 1, 1938

2,109,451

UNITED STATES PATENT OFFICE 2,109,451

SOUNDHEAD

Fred J. Loomis, Haddonfield, N. J., and Ellwood W. Reynolds, Drexel Hill, Pa., assignors to Radio Corporation of America, a corporation of Delaware Original application October 14, 1932, Serial No. 637,852, now Patent No. 2,019,147, dated October 29, 1935. Divided and this application June 26, 1935, Serial No. 28,444

4 Claims. (Cl. 179—100.3)

This invention relates to soundheads such as those adapted to be used in combination with motion picture apparatus for the purpose of producing talking motion pictures, and is a division of our application No. 637,852 filed October 14, 1932 now Patent No. 2,019,147, granted Oct. 29, 1935. It will be apparent, however, that its utility is by no means limited to such use.

It has for many years been customary in the talking picture art to provide a sound reproducing mechanism commonly known as a soundhead which is adapted for attachment to a motion picture projector and which is provided with a drive mechanism common to both the soundhead and the projector so that a single film carrying both the picture and sound records can be run consecutively through the two instrumentalities and sound can be reproduced from the film in exact synchronism with the picture projected from the same film.

The soundhead ordinarily includes an exciter lamp, an optical system and a photoelectric cell, although any other desirable form of sound take-off may be used. The sound record moving mechanism may be mounted inside or exterior to the soundhead. Considerable difficulty has heretofore been encountered in the past due to the necessity for moving the film at an absolutely uniform speed past the sound reproduction point, the production of such uniform movement being rendered difficult because of the necessity of moving the film by means of sprockets cooperating with the sprocket holes therein, and because of irregularities in the operation of the driving mechanism and its attendant gearing.

One object of the invention is the production of a soundhead which is adapted to cooperate with the standard types of motion picture apparatus and which is capable of such an extremely accurate movement of the film that a high degree of fidelity of the reproduced sound is realized.

Another object of the invention is the production of such a soundhead having greatest possible simplicity and lowest production cost.

Another object of the invention is the production of a sound head having a minimum number of moving parts.

Another object of the invention is the production of a soundhead which will permit large manufacturing tolerances and at the same time produce a device having an extremely high degree of precision.

Another object of the invention is to provide a roller which will firmly hold the film in contact with the supporting drum at the reproduction point and guide it in a straight line laterally as it passes around the drum.

Another object of the invention is to provide a guide roller which will laterally guide any given standard width of film regardless of the shrinkage thereof.

Another object of the invention is to provide a guide roller whose frictional resistance to the film roller is small and whose variations to the resistance are negligible whereby it affects to the least possible extent the motion of the film drum.

Another object of the invention is to provide a lamp socket which will gently yet positively hold the exciter lamp in proper alignment with the optical system.

Another object of the invention is to provide a lamp socket which can be instantly and easily removed or replaced in exact position in the machine, thus allowing a burnt out exciter lamp to be instantly replaced by a new one without requiring readjustment of the optical system.

Another object of the invention is to provide a lamp socket having mechanical characteristics which give it sufficient flexibility to prevent microphonic noises from the lamp, and at the same time sufficient stiffness to hold the filament in correct position.

Another object of the invention is to provide an extremely simple and dependable film stripper.

Another object of the invention is to provide an improved pad roller for retaining the film upon the driving sprockets which is held definitely in position but which is easily adjustable.

Another object of the invention is to provide a soundhead which will magnetically and electrostatically shield within itself the transformer used in conjunction with the photoelectric cell.

Another object of the invention is to provide a soundhead wherein the driving motor is built into the soundhead.

Another object of the invention is to provide a soundhead with the motor built thereinto with means for preventing stray magnetic fields and induced currents from the motor from permeating the soundhead.

Another object of the invention is to provide means for manually actuating the driving mechanism for purposes of adjustment, etc.

Another object of the invention is the provision of a pressure roller which will hold the film upon the film drum with a uniform pressure and with a minimum of friction.

Another object of the invention is to provide an adjustment socket for the exciter lamp.

Another object of the invention is to provide improved pad rollers and means of adjustment therefor for retaining the film upon the sprockets.

Another object of the invention is to provide an improved film stripper for positively stripping the film from the sprocket teeth.

Figure 2:
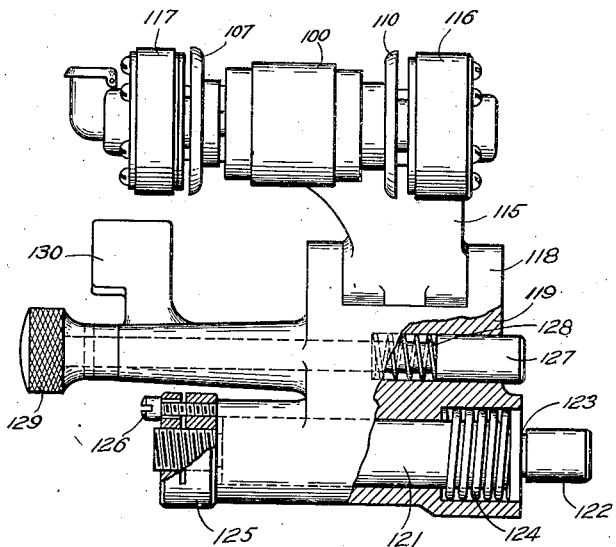
Figure 3:
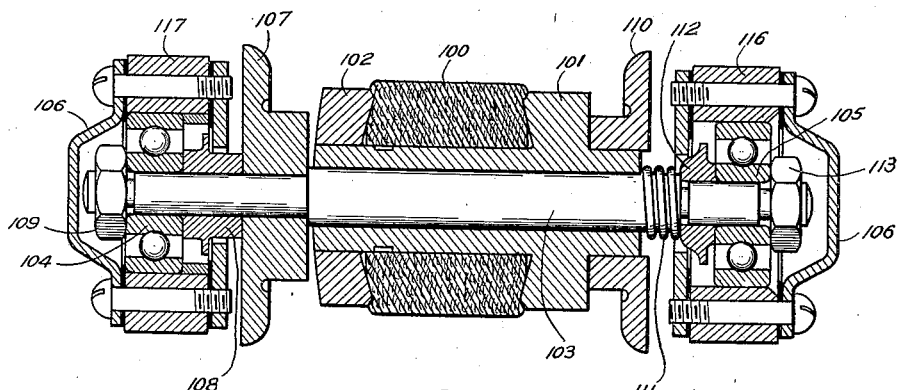
Figure 5:
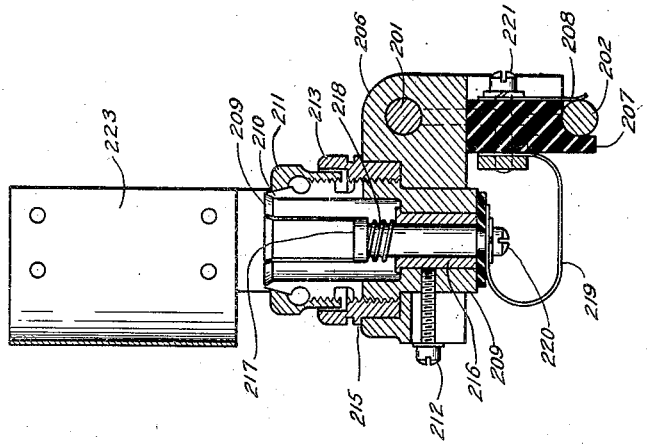
Figure 4:
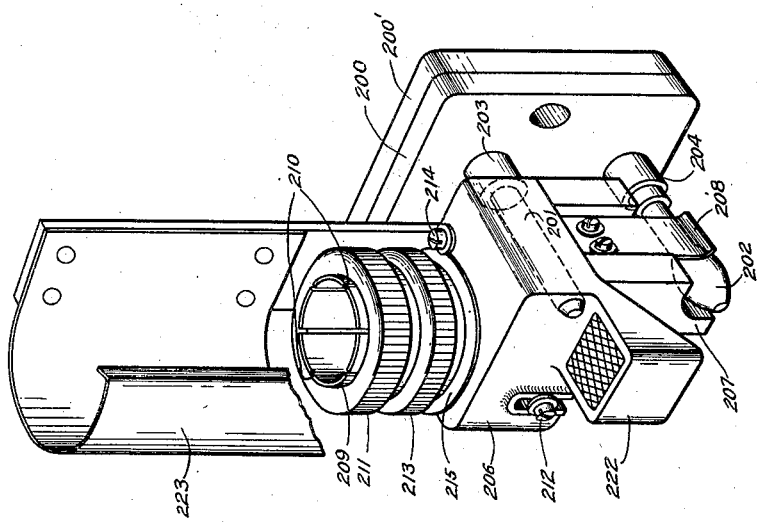

In the drawings:

Figs. 1, 2, and 3 show details of the pressure roller which holds the film upon the drum, Figs. 4 and 5 show the adjustable socket for the exciter lamp, Figs. 6 to 9 show the details of the pad rollers, and Fig. 10 shows the film stripper.

Pressure roller

It is necessary, in a device of the class described, that the pressure roller indicated generally at 70 shall hold the film firmly against the film drum without slippage; that it rotate so freely as to avoid any interference with the operation of the drum; and that it guide the film laterally to maintain it exactly in position between the optical system and the photocell. This portion of the device is shown in Figs. 1 to 3 inclusive.

The roller surface 100 is formed from a fine grade of felt, and after being placed upon the combined spindle and clamping ring 101 is fastened rigidly thereupon by the member 102 and thereafter ground to an accurate circular form. The member 101 is mounted upon a shaft 103 which extends entirely through the rotating portions of the unit. This shaft is carried in ball-bearings 104 and 105 which are mounted in a bracket hereinafter described and protected by the collar members 106. Mounted firmly upon the shaft and abutting against the collar thereof is the guide member 107 which serves to guide the edge of the film adjacent the soundtrack. The member 107 is separated from the adjacent ball-bearing 104 by the spacer member 108 which, with the assistance of the nut 109, holds the member 107 firmly against the shoulder on the shaft 103.

The member 101 has fitted firmly thereupon a member 110 which corresponds in general appearance and function to the member 107, but the entire unit comprising the members 100, 101, 102, and 110 is slidable longitudinally on the shaft 103 and is pressed toward the member 107 by the spring 111. The spring 111 is fixed in position by the collar 112 which fits against the shoulder on the shaft 103 and is held thereagainst by the nut 113 and the inner ring of the ball-bearing 105. The spacing of the members 107 and 110 is so chosen that they will be slightly separated when a film of the minimum usable width is between them, and will of course be separated a greater distance by wider film. Due to the long bearing of the member 101 upon the shaft 103, the members 107 and 110 will always remain in exact parallelism, while the entire unit will rotate freely upon the ball-bearings 103 and 105.

The bearings 104 and 105 are supported in the bracket member 115 which has the ring members 116 and 117 formed integral therewith. This bracket member is pivoted at 118 in a second bracket member 119. This pivoted joint, as shown in Figs. 8 and 9, is capable of only a very slight movement and serves to permit a slight vertical movement of the roller 100 in engaging the film upon the drum 50. The drum 100 is maintained in a firm but yielding engagement with the drum 50 by means of the spring 120 and the ball 120' shown in Fig. 1, in which figure they urge the bracket 115 toward the right.

The bracket 119 is mounted upon the pin 121 which is a "press" fit in the center plate of the soundhead due to the shaping of the end 122 to fit an appropriately diametered hole in the center plate, in order that the pin 121 may be maintained accurately perpendicular to the said center plate without the inaccuracies ordinarily resulting from the tapping of a hole, or the threading of the end of the pin to fit into the tapped hole. The collar 123 fits snugly against the center plate, and against this collar bears the spring 124 which fits, as shown, into a recess in the member 119 and thrusts the member 119 toward the outer end of the pin and against the member 125. The member 125 is threaded upon the outer end of the pin 121 so that it may be adjusted longitudinally thereon, is split and provided with a lock-screw 126 as shown. Lateral adjustment of the side guides 107 and 110 relative to the roller 50 is accomplished by loosening the screw 126 and rotating the member 125 until the guides 107 and 110 are in the proper positions when the member 125 is again locked by tightening the screw 126.

It is, of course, necessary to lock the pressure roller in operative position against the roller 50, and to remove it from that position. Locking is accomplished by means of the bolt 127 which is retained by an appropriate aperture in the center place, or by an adjustable plate secured thereupon. The bolt 127 is urged toward the center plate by the spring 128 and may be pulled outwardly by the knob 129. A thumb piece 130 is also provided. To open the pressure roller the knob 129 is pulled outwardly, whereby the bolt 127 is removed from its aperture, and the pressure roller is permitted to drop back, while to close it into operating position the assembly is merely rotated by pressure of the member 130 until the bolt 127 snaps into the appropriate aperture, when the entire unit is locked in operating position. In operating position the roller is raised slightly against the pressure of the spring 120', which then maintains it in contact with the film upon the film drum.

Exciter lamp socket

The construction of the exciter lamp socket is shown in detail in Figs. 4 and 5.

It is necessary, in photophonographic apparatus, that the exciter lamp be held rigidly in position, that it be adjustable vertically to align it with the optical system, that it be provided with adequate and non-microphonic contacts, that it be held firmly against rotation during vertical adjustment, and that it be instantly replaceable by another pre-adjusted lamp. We have attained all these results by the construction shown.

A base plate 200 of insulating material is provided, which is attached to the center plate of the soundhead. Projecting from this base-plate are two round pins 201 and 202 provided with collars 203 and 204. The pins are insulated from each other by the base-plate, and the feed-wires 205 are electrically connected to the pins.

A body member 206 is provided, having an aperture extending therethrough adapted to cooperate with the pin 201. A block of insulating material 207 is attached to the bottom of the member 206 and is provided with a groove at its bottom adapted to cooperate with the pin 202. It will be apparent from Fig. 5 that substantially the entire weight of the unit lies to one side of the vertical plane of the pins 201, 202 and the insulating block 207 is thereby pressed firmly against the rod 202. A contact spring 208 is carried by the block 207 and presses firmly against the opposite side of the rod or pin 202.

When the members 206 and 207, forming a unit, are slid upon the rods 201 and 202, they can be slid toward the base-member 200 until they strike the collars 203 and 204, and these collars thereby accurately determine the position of the socket laterally of the soundhead, while the rods determine the position and orientation thereof in all other planes.

The outer end of the rod 202 is, as shown, made slightly larger than the remainder thereof, so that the pressure of the spring 208 thereupon tends to maintain the body member 206 firmly against the collar 203.

The rear portion of the base-member 200 consists of a felt pad 200', which serves to absorb any vibration which might otherwise be imparted to the socket from the mechanism of the soundhead or projector and produce microphonic noises from the lamp.

The base of the lamp itself is held in the chuck member 209, which is provided with yieldable jaws at its top. The lower portion of the chuck is round and is vertically slidable in a hole in the member 206 in which it fits snugly. Slots 210 are provided in the chuck jaws, and the pins extending from the sides of the lamp base fit into these slots and prevent rotation of the lamp base in the chuck. A clamping nut 211 is fitted to the upper portion of the chuck for forcing the jaws inwardly against the lamp base.

The chuck is prevented from rotating in the member 206 by the screw 212, which is threaded into the chuck as shown in Fig. 5 and is movable vertically in a slot as shown in Fig. 4. After the chuck has been adjusted to the proper vertical position, it is clamped by tightening the screw 212 against the member 206.

Vertical adjustment of the chuck is accomplished by rotation of the nut 213. This nut, as shown in Fig. 5, fits into a recess in the member 206 and is held therein as shown in Fig. 4 by the screw 214 which fits over the collar 215. Since the chuck 209 is threaded to fit the nut 213, it will be apparent that rotation of the vertically-fixed nut will result in vertical movement of the chuck.

Within the chuck at the bottom there is provided an insulating bushing 216, within which a contact member 217 is freely slidable, being pressed upwardly by the spring 218 which maintains it firmly in contact with the contact-pin on the bottom of the lamp. A connection strip 219 is attached to the bottom of the contact member 217 by a screw 220 and is connected to the spring 208 by a bolt 221, thereby establishing an electrical circuit to the contact 217 from the rod 202, while the base of the lamp is connected to the rod 201 by the chuck and the body member 206.

A knurled knob 222 is provided by which the body member may be grasped for removal or replacement.

It will be apparent that one or more extra lamps may be adjusted in as many sockets, and if a lamp fails during operation of the apparatus, it requires but an instant to remove the lamp and socket and slide another pre-adjusted lamp into place.

A shield 223 is provided to prevent stray light.

Pad roller assembly

The pad roller assemblies are shown in detail in Figs. 6 to 9.

It is necessary that these rollers should definitely maintain the film upon the sprockets, but, on the other hand, it is undesirable that they should touch the film except when necessary to perform their function. It is accordingly customary to adjust these rollers so that they are spaced from the surface of the sprocket about twice the thickness of the film. There is a possibility that splices may be even thicker than this, and it is therefore necessary to hold the pad rollers not only definitely but yieldably in this position.

It is further necessary that the rollers be instantly releasable for the purpose of threading the machine; and we accomplish all these results by the construction shown.

The roller itself is indicated at 250, in Figs. 6 and 7, and is freely rotatable upon a shaft fixed in the movable arm 251 and carrying the knurled knob 252 at its outer end. The arm 251 is pivoted upon the shouldered screw 253, which is fitted into the center plate of the machine, the shoulder 253' fitting against the center plate and establishing proper clearance beneath the head of the screw from free motion of the arm 251.

The plate 254 lies between the arm 251 and the center plate, and is held against rotation about the screw 253, which passes through the hole 257 (Figs. 8 and 9) by the screw 255 which passes through the slot 256. The slot 256 is arcuate in shape, and the plate 254 may be angularly adjusted by a corresponding amount about the screw 253.

As shown in Figs. 8 and 9, both sides of the plate 254 are alike, so that it may be used either "right-handed" or "left-handed", as rendered desirable by the location of surrounding parts.

The extreme limits of motion of the arm 251 are determined by the ends of the arcuate recess 258 into which the round pin 259 fits, the pin 259 being a "force fit" in a hole in the arm 251.

The arm is held at either end of its travel by the ball 261 and the coil spring 262. The plate 254 is provided with holes 260 into which the coil spring tends to force the ball, but these holes are so located that when the pin 259 is at either end of its travel in the recess 258 the ball 261 is not quite seated in the corresponding hole, and the arm is thereby held firmly in position.

Since the holding, locating, and adjusting means just described function equally well at either end of the travel of the arm 251, either end may be used as the sprocket position; and in addition the plate 254 is reversible as before described.

Film stripper

Film sometimes has a tendency to cling to the sprocket teeth, and it is accordingly necessary to provide members extending past the teeth to a point adjacent to the surface of the sprocket for stripping the film from the teeth.

Heretofore, the film strippers have usually been formed of several parts secured together by screws. We have found such constructions to be expensive and unreliable, and have accordingly devised the stripper shown in Fig. 10.

A rod 300 is provided, the round end of which is adapted to fit tightly into a hole provided therefor in the center plate of the apparatus. The other end of the rod is cut away as shown at 301 to provide a flat surface having a width substantially equal to the diameter of the rod.

A plate 302 is provided, and this is cut away at 303 to fit around the sprocket teeth, the edges 304 being in close proximity to the face of the sprocket.

The plate 302 is spot-welded at 305 to the flat surface of the rod 300, thereby providing a construction which is not only less expensive than that of the prior art, but which cannot be shaken apart or out of adjustment by vibration or by the impacts of film thereagainst.

Having described the construction and operation of our apparatus and the advantages thereof;

We claim:

1. An exciter lamp socket comprising means for holding the exciter lamp in accurate orientation about its vertical axis, clamping means for rigidly securing the said lamp, and means for adjusting the said clamping means vertically.

2. An exciter lamp socket comprising means for holding the exciter lamp in accurate orientation about its vertical axis, clamping means for rigidly securing the said lamp, means for adjusting the said clamping means vertically, and means for securing said clamping means in an adjusted position.

3. Exciter lamp supporting means for photophonographic apparatus having a center plate, comprising a vibration absorbing pad adapted to be mounted upon said center plate, a base plate supported upon said vibration absorbing pad on the opposite side thereof from the said center plate, and a pair of electrically conducting rods extending perpendicularly from said base plate for supporting a lamp socket.

4. Exciter lamp supporting means for photophonographic apparatus having a center plate, comprising a vibration absorbing pad adapted to be mounted upon said center plate, a base plate supported upon said vibration absorbing pad on the opposite side thereof from the said center plate, a pair of electrically conducting rods extending perpendicularly from said base plate, a lamp socket slidable upon said rods, and spring means co-acting with one of said rods for maintaining the said socket in operating position.

FRED J. LOOMIS.
ELLWOOD W. REYNOLDS.